US008244748B2

(12) United States Patent
Cragun et al.

(10) Patent No.: US 8,244,748 B2
(45) Date of Patent: *Aug. 14, 2012

(54) INCLUDING ANNOTATION DATA WITH DISPARATE RELATIONAL DATA

(75) Inventors: Brian J. Cragun, Rochester, MN (US); Douglas R. Fish, Rochester, MN (US); Cale T. Rath, Byron, MN (US); Hoa T. Tran, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 621 days.

This patent is subject to a terminal disclaimer.

(21) Appl. No.: 12/119,691

(22) Filed: May 13, 2008

(65) Prior Publication Data

US 2008/0215579 A1 Sep. 4, 2008

Related U.S. Application Data

(63) Continuation of application No. 10/728,288, filed on Dec. 4, 2003, now Pat. No. 7,373,342.

(51) Int. Cl.
*G06F 17/30* (2006.01)
(52) U.S. Cl. ...................................... 707/763
(58) Field of Classification Search .......... 707/713–717, 707/763–782
See application file for complete search history.

(56) References Cited

U.S. PATENT DOCUMENTS

| 5,253,362 | A | * | 10/1993 | Nolan et al. ................. 715/201 |
| 5,991,365 | A | | 11/1999 | Pizano et al. |
| 6,011,546 | A | | 1/2000 | Bertram |
| 6,041,335 | A | | 3/2000 | Merritt et al. |
| 6,275,223 | B1 | | 8/2001 | Hughes et al. |
| 6,519,603 | B1 | | 2/2003 | Bays et al. |
| 6,618,733 | B1 | * | 9/2003 | White et al. .................. 707/739 |
| 6,924,425 | B2 | | 8/2005 | Naples et al. |
| 6,996,558 | B2 | | 2/2006 | Dettinger et al. |
| 6,999,963 | B1 | * | 2/2006 | McConnell .................... 715/731 |
| 7,020,848 | B2 | | 3/2006 | Rosenzweig et al. |
| 7,065,705 | B1 | | 6/2006 | Wang et al. |
| 7,373,342 | B2 | * | 5/2008 | Cragun et al. ......... 707/999.004 |
| 2002/0078446 | A1 | * | 6/2002 | Dakss et al. .................. 725/37 |
| 2002/0113803 | A1 | * | 8/2002 | Samra et al. .................. 345/619 |
| 2003/0196094 | A1 | * | 10/2003 | Hillis et al. .................... 713/179 |
| 2004/0163050 | A1 | | 8/2004 | Matter |
| 2004/0260714 | A1 | | 12/2004 | Chatterjee et al. |
| 2005/0039123 | A1 | | 2/2005 | Kuchinsky et al. |
| 2005/0203876 | A1 | | 9/2005 | Cragun et al. |

OTHER PUBLICATIONS

Dictionary of Computer Science, Engineering, and Technology, CRC Press LLC, 2001, pp. 45, 220, 487.*

* cited by examiner

*Primary Examiner* — Wilson Lee
(74) *Attorney, Agent, or Firm* — Patterson & Sheridan, LLP

(57) ABSTRACT

Methods, systems, and articles of manufacture that may be used for identifying and indicating annotations made for a variety of different type (i.e., heterogeneous) data objects are provided. According to some embodiments, an annotation store may be queried to identify annotations for data objects in a current view of data. For certain identifiable portions of the view (e.g., a row in a relational view), a callable function may be created that returns a set of indicia maps indicating which objects in the portions are annotated. Bits in an indicia map may correspond to different objects (e.g., individual cells in a row or the row itself). Using these indicia maps, an indication of which data objects are annotated may be provided in the view, for example, by displaying annotation icons proximate annotated objects.

9 Claims, 8 Drawing Sheets

INCLUDING ANNOTATION DATA WITH DISPARATE RELATIONAL DATA

CROSS-REFERENCE TO RELATED APPLICATIONS

This application is a continuation of U.S. patent application Ser. No. 10/728,288, filed Dec. 4, 2003 now U.S. Pat. No. 7,373,342, which is herein incorporated by reference in its entirety.

BACKGROUND OF THE INVENTION

1. Field of the Invention

The present invention relates to the field of data entry and retrieval and, more particularly, to a method and system for indicating the existence of annotations made for a variety of heterogeneous data objects.

2. Description of the Related Art

An annotation system is used to create, store, and retrieve descriptive information about objects. Virtually any identifiable type of object may be annotated, such as a matrix of data (e.g., a spreadsheet or database table), a text document, or an image. Further, subportions of objects (sub-objects) may be annotated, such as a cell, row, or column in a database table or a section, paragraph, or word in a text document. Some annotation systems store annotations separately, without modifying the annotated data objects themselves. For example, annotations are often contained in annotation records stored in a separate annotation store, typically a database. The annotation records typically contain information about the annotations contained therein, such as the creation date and author of the annotation, and an identification of the annotated data object, typically in the form of an index.

An indexing scheme is typically used to map each annotation to the annotated data object or sub-object, based on the index. Therefore, the index must provide enough specificity to allow the indexing scheme to locate the annotated data object (or sub-object). Further, the indexing scheme must work both ways: given an index, the indexing scheme must be able to locate the annotated data object and, given an object, the indexing scheme must be able to calculate the index for use in classification, comparison, and searching (e.g., to search for annotations for a given data object). Databases are typically used as the annotation store for performance reasons, so that annotation records can be efficiently stored and retrieved.

When a user views a portion of a data (e.g., results received in response to issuing a query), it is generally desirable to display annotations made for data objects in the view. The fact that the annotations and the data described by the annotations may be stored in totally separate data stores may present a problem, however, as there is currently no readily available technique for tying together data from totally separate data stores. For example, the data source and annotation store typically have no primary keys in common form that can be used for a standard join.

Accordingly, there is a need for a method for identifying and indicating annotations made for a variety of different type data objects.

SUMMARY OF THE INVENTION

The present invention generally is directed to a method, system, and article of manufacture for identifying and indicating annotations made for a variety of different type data objects.

One embodiment provides a method for indicating objects in a view of data having corresponding annotations. The method generally includes querying an annotation store to identify annotations corresponding to objects in the view, generating one or more indicia maps indicating which, if any, objects in the view have corresponding annotations, and providing an indication of which, if any, objects in the view have corresponding annotations, based on the one or more indicia maps.

Another embodiment provides a method for indicating annotated objects in a relational view of data having rows of individual cells. The method generally includes querying an annotation store to identify annotations corresponding to objects in the view, generating one or more indicia maps indicating which, if any, objects in the view have corresponding annotations, wherein the one or more indicia maps each comprise a single bit corresponding to a row and one or more bits corresponding to individual cells in the row, and providing an indication of which, if any, objects in the view have corresponding annotations, based on the one or more indicia maps.

Another embodiment provides a computer-readable medium containing a program for indicating objects in a view of data that have annotations. When executed by a processor, the program performs operations comprising querying an annotation store to identify annotations corresponding to objects in the view, generating one or more indicia maps indicating which, if any, objects in the view have corresponding annotations, and providing an indication of which, if any, objects in the view have corresponding annotations, based on the one or more indicia maps.

Another embodiment provides a system for indicating objects in a view of data having corresponding annotations, generally including an annotation database for storing annotation records containing annotations for the different type data objects and an executable component. The executable component is generally configured to query the annotation database to identify annotations corresponding to objects in the view of data, generate one or more indicia maps indicating which, if any, objects in the view have corresponding annotations, and provide an indication of which, if any, objects in the view have corresponding annotations, based on the one or more indicia maps.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
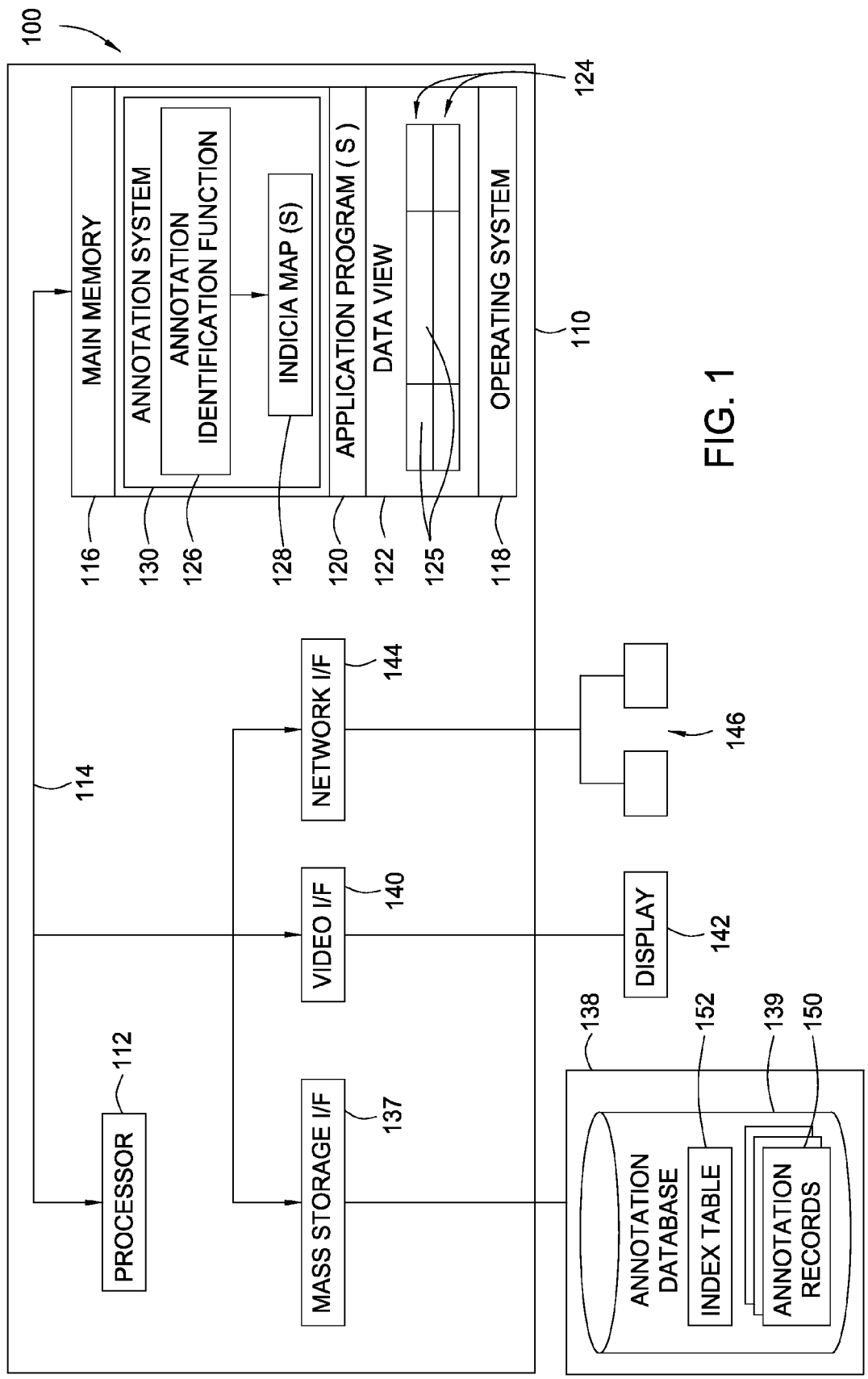
FIG. 1 is a computer system illustratively utilized in accordance with embodiments of the present invention.

The present invention provides methods, systems, and articles of manufacture that may be used for identifying and indicating annotations made for a variety of different type (i.e., heterogeneous) data objects. According to some embodiments, an annotation store may be queried to identify annotations for data objects in a current view of data. For certain identifiable portions of the view (e.g., a row in a relational view), a callable function may be created that returns a set of data objects, referred to herein as indicia maps, indicating which objects in each portion are annotated. Each bit in an indicia map may correspond to a different object (e.g., individual cells in a row or the row itself). Using this indicia map, an indication of which objects in a view are annotated may be provided in the view, for example, by displaying annotation icons proximate annotated objects.

As used herein, the term annotation generally refers to any type of descriptive information associated with one or more data objects. Annotations may exist in various forms, including textual annotations (descriptions, revisions, clarifications, comments, instructions, etc.), graphical annotations (pictures, symbols, etc.), sound clips, etc. While an annotation may exist in any or all of these forms, to facilitate understanding, embodiments of the present invention may be described below with reference to textual annotations as a particular, but not limiting, example of an annotation. Accordingly, it should be understood that the following techniques described with reference to textual annotations may also be applied to other types of annotations, as well, and, more generally, to any type of data object that references another data object.

As used herein, the term view generally refers to any visible (or virtual) collection of data containing a set of visible sub-objects, regardless of the underlying data type (e.g., whether a database table, document, schematic, etc.). However, to facilitate understanding, the following description will refer to specific embodiments that relate to views of tabular data arranged in rows and columns defining visible cells. While such embodiments are described with reference to views of query results generated in response to issuing a query, it should be understood that such views may also be generated according to any other technique, for example, using saved query results or any other type of data. Further, as used herein, the term indicia map generally refers to any type data object indicating which, if any, of a corresponding set of data objects have corresponding annotations. To facilitate understanding, however, the following description will refer to specific embodiments that utilize a simple bit map (or bit mask) with individual bits used to indicate the existence of annotations for corresponding objects, as a specific, but not limiting example of a type of data object that may be used as an indicia map.

One embodiment of the invention is implemented as a program product for use with a computer system such as, for example, the computer system 110 of the data processing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Environment

Referring now to FIG. 1, the data processing environment 100 is shown. In general, the data processing environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries computer system available from International Business Machines (IBM) of Armonk, N.Y.

The computer system 110 could include a number of operators and peripheral systems as shown, for example, by a mass storage interface 137 operably connected to a direct access storage device (DASD) 138, by a video interface 140 operably connected to a display 142, and by a network interface 144 operably connected to the networked devices 146. The display 142 may be any video output device for outputting viewable information. The networked devices 146 may be any combination of any type networked devices, such as networked workstations, servers, printers, and network accessed storage (NAS) devices.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., DASD 138) or on another computer coupled to the computer system 110 via bus 114.

The memory 116 is shown configured with an operating system 118. The operating system 118 is the software used for managing the operation of the computer system 110. Examples of suitable operating systems include such as IBM's OS/400, IBM's AIX, Unix, Linux, Microsoft Windows®, and the like. The memory 116 further includes at least one application 120 and an annotation system 130. For some embodiments, the annotation system 130 may be integrated with the operating system 118 and/or may be capable of operating in a stand alone manner, for example, without an application 120.

The application 120 and the annotation system 130 are software products comprising a plurality of instructions that are resident at various times in various memory and storage devices in the computer system 110. When read and executed by one or more processors 112 in the computer system 110, the application 120 and the annotation system 130 cause the computer system 110 to perform the steps necessary to execute steps or elements embodying the various aspects of the invention. The application 120 is generally configured to access data in a database, for example, by issuing queries. Queries issued by the database may return sets of results displayed as views of data 122. In some cases, the database is a relational database and the results may be organized in rows and columns. Accordingly, a data view 122 may comprise one or more rows 124 of cells 125, with each cell 125 identified by a corresponding row-column pair.

As illustrated, the annotation system 130 may also include one or more annotation identification functions 126 designed to identify which data objects of a given view 122 have corresponding annotations. As will be described in greater detail below, for some embodiments, the annotation identification functions 126 may generate a set of indicia maps 128, each having a plurality of bits corresponding to different data objects in the data view 122. For example, for a relational data view, the annotation identification functions 126 may generate an indicia map 128 for each row in the view 122. Each indicia map 128 may contain a single bit to indicate an annotation exists for a corresponding row, and a plurality of bits to indicate annotations exist for individual cells in the row.

An Exemplary Annotation System

The annotation system 130 is generally configured to allow users of the application program 120 to create, store, and retrieve annotations associated with various portions of a data view 122 (e.g., a cell 125, group of cells 125, or a row 124). The annotation system 130 may be any suitable type of annotation system and, for some embodiments, may be similar to the universal annotation system described in the commonly owned, co-pending application Ser. No. 10/600,014, entitled "Universal Annotation System," filed Jun. 20, 2003, herein incorporated by reference. As described therein, the annotation system 130 may be separate from the application 120, an integral part of the application 120 or a "plug-in" application.

The annotations may be contained in annotation records 150, for example, stored in an annotation database 139 (e.g., in the DASD 138). The annotation records 150 may also contain various information about the annotation, such as the author and creation date of the annotation, as well as an index identifying the annotated data object 122. For some embodiments, the annotation system 130 may include an indexing component configured to generate an index for an annotated data object, for example, based on one or more parameters identifying the annotated data object (e.g., a database table, row, and/or column). Indexes created for annotated data objects 122 may be stored in an index table 152 in the annotation data base 139. For some embodiments, the index table 152 may be queried to identify annotations for portions of the data view 122.

Figure 2A:
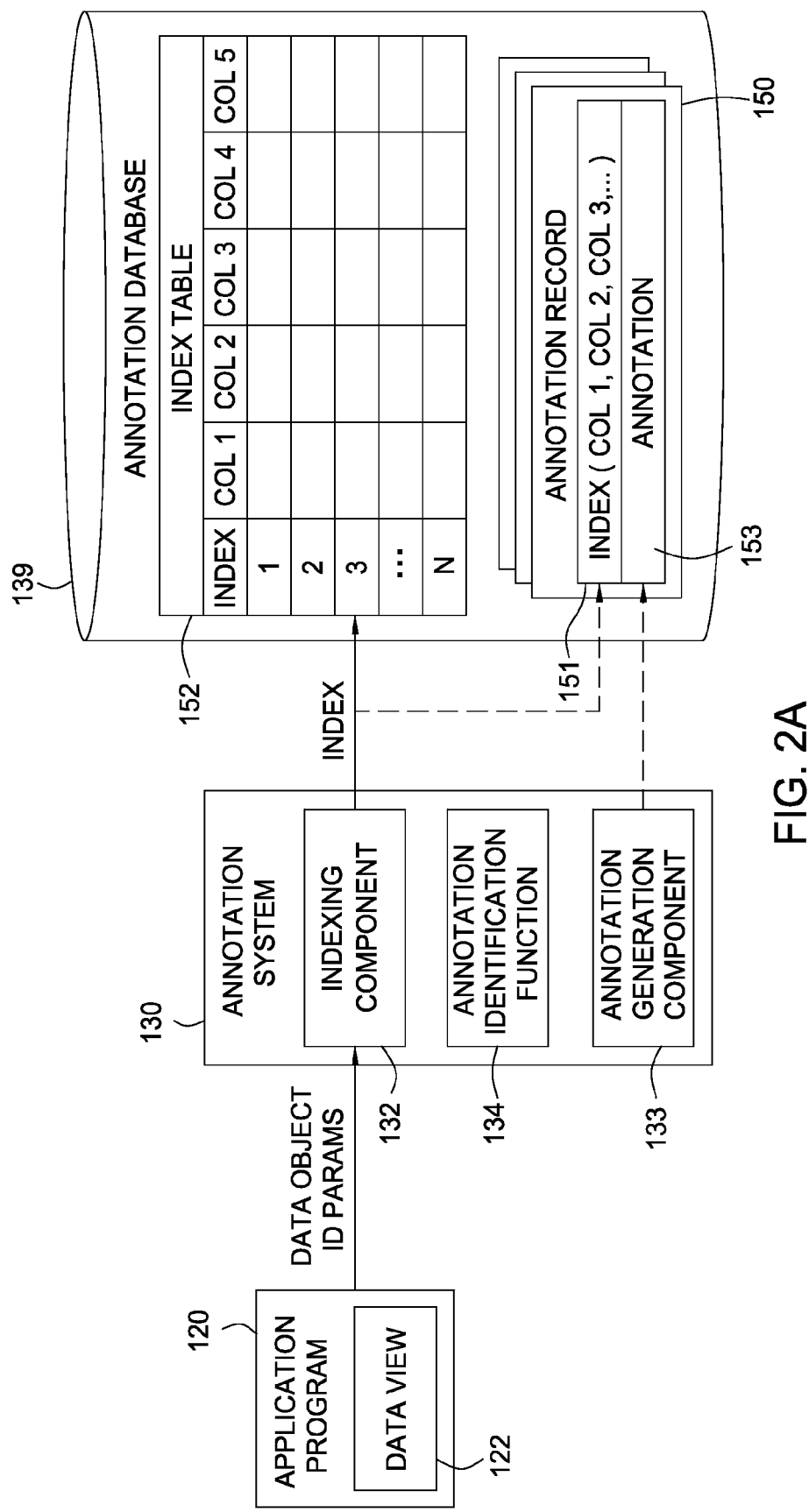
FIGS. 2A and 2B are relational views of exemplary components according to one embodiment of the present invention.
Figure 2B:
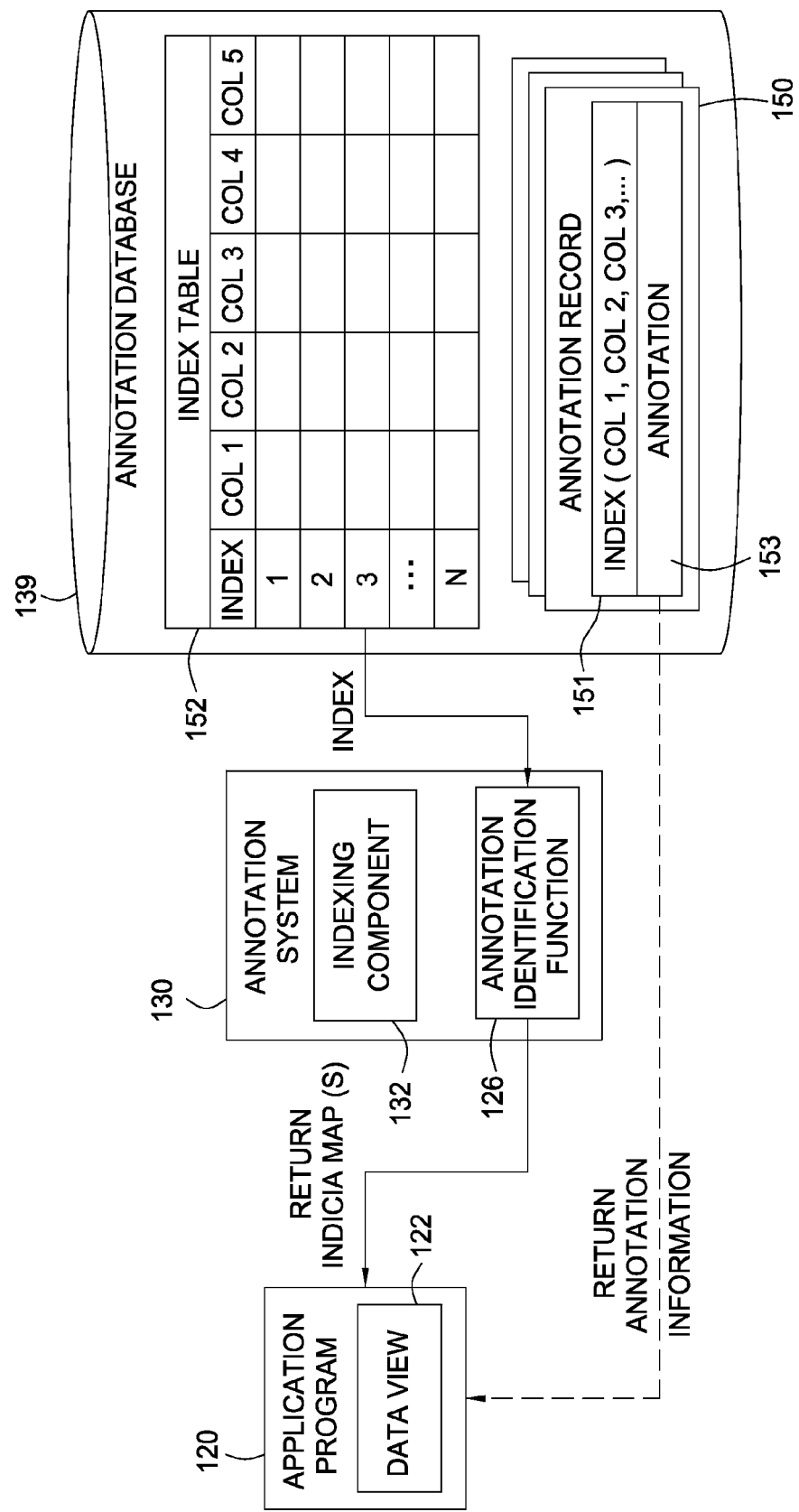

FIGS. 2A and 2B are relational views of various components of the annotation system 130 shown during annotation generation and annotation retrieval, respectively, that illustrate the creation and utilization of indexes according to one embodiment of the present invention. As illustrated in FIG. 2A, an annotation for an object of the data view 122 (identified by a set of ID parameters) may be created via an annotation generation component 133. An indexing component 132 may create an index 151 based on the set of ID parameters, for use in indexing an annotation 153 created for the identified data object.

For some embodiments, entries in the index table 152 may simply contain ID parameters indicating an annotated data object (e.g., identification of a data source/table, a row, and column). For other embodiments, however, table entries may include index parameters generated based on the ID parameters. Such indexing techniques are described in the commonly assigned, co-pending application Ser. No. 10/600,382, entitled "Heterogeneous Multi-Level Extendable Indexing For General Purpose Annotation Systems," filed Jun. 20, 2003.

In any case, as illustrated in FIG. 2B, the annotation database 139 and/or index table 152 may also be queried to obtain ID parameters corresponding to data objects in a view 122 having annotations (e.g., as indicated by the existence of corresponding entries in the index table 152), as well as to return corresponding annotation information. As illustrated, based on the results of the query (which may return a set of indexes for annotated data sources and sub-objects contained therein), the annotation identification function 126 may generate and return (to the application 120) a set of indicia maps 128 indicating which objects in the data view 122 are annotated.

Identifying and Indicating Annotations

Figure 3A:
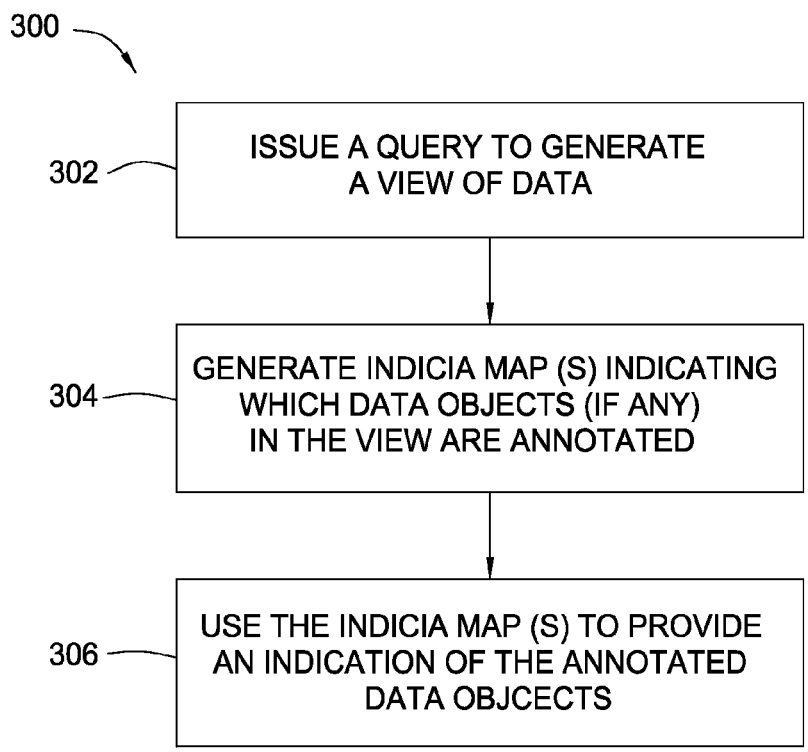
FIGS. 3A-3C are flow diagrams of exemplary operations for identifying and indicating annotations according to one embodiment of the present invention.
Figure 4D:
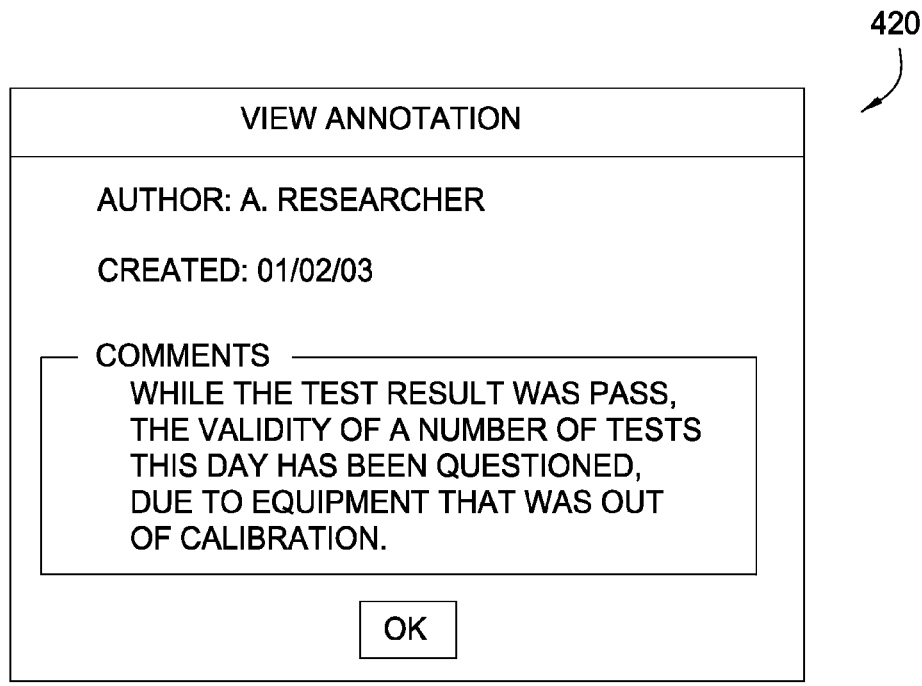
FIGS. 4A-4E are exemplary graphical user interface (GUI) screens according to one embodiment of the present invention.
Figure 3B:
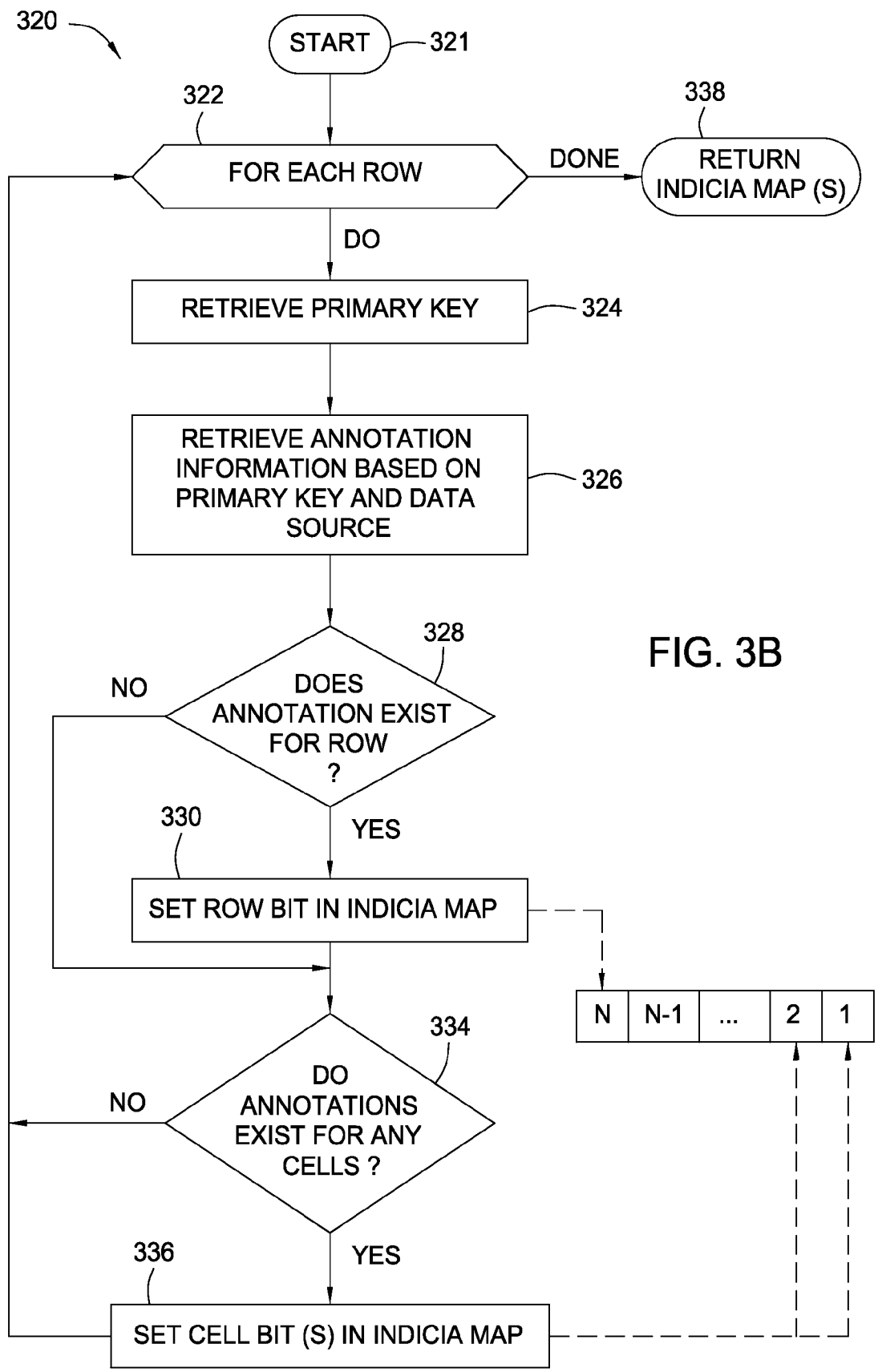
Figure 3C:
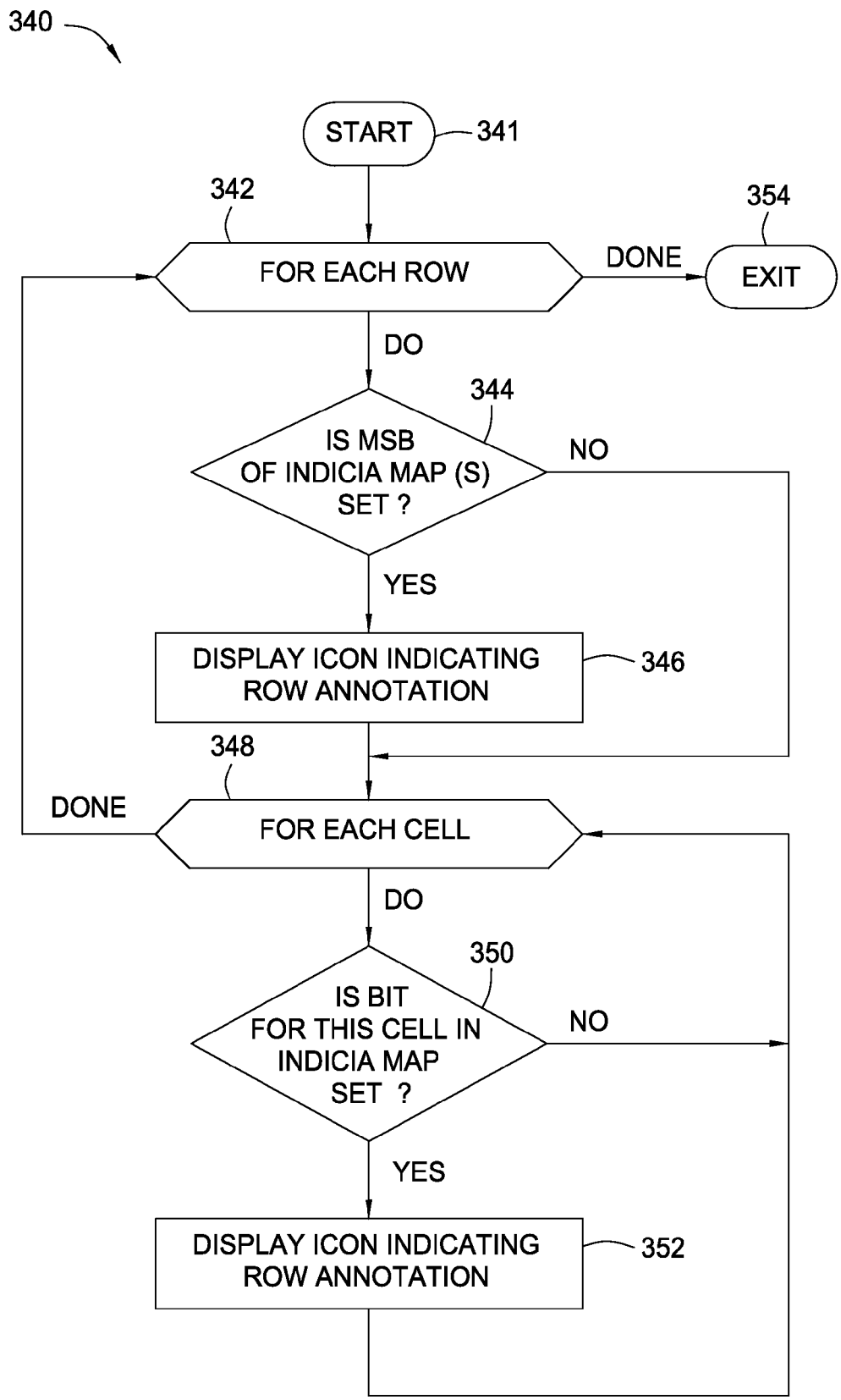

FIG. 3A is a flow diagram of exemplary operations 300 that may be performed, for example, by the application 120 and annotation identification function 126, to generate a data view 122, identify the existence of annotations for data objects in the data view 122, and provide an indication of such. FIGS. 3A-3C may all be described with simultaneous reference, at appropriate times, to FIGS. 4A-4E which illustrate exemplary GUI screens showing an exemplary data view 122.

Figure 4A:
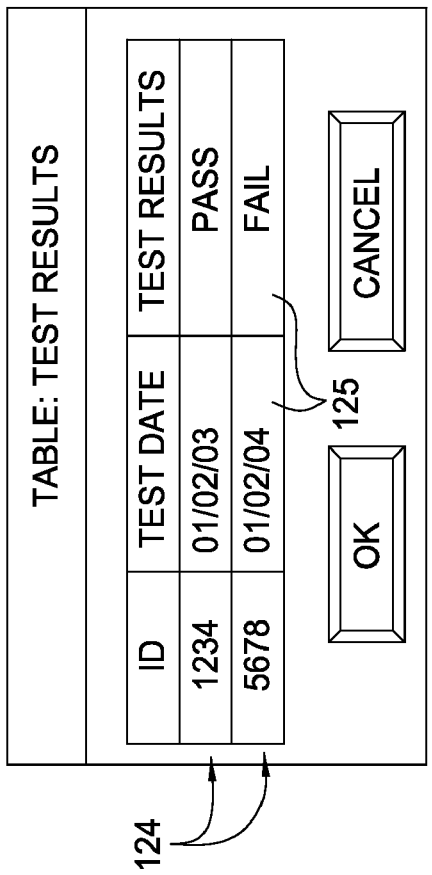

The operations 300 of FIG. 3A begin, at step 302, by issuing a query to generate the view of data. As illustrated in FIG. 4A, the view of data 122 may be include relational data received in response to issuing the query. Illustratively, the view of data 122 contains two rows 124 of test results, with three columns (test ID, test date, and test results). At step 304, an indicia map is generated indicating which data objects (if any) in the view 122 are annotated. At step 306, the indicia map is used to provide an indication of the annotated data objects in the view 122.

As previously described, annotations may exist for the rows 124 or individual cells 125 of the data view 122 and, for some embodiments, an indicia map may be generated for each row 124. TABLE I, below, illustrates an exemplary table that maps bits in an exemplary type indicia map to individual data objects in a row 124. As illustrated, a single bit (e.g., the most significant bit N as shown) may be mapped to the row itself, while the remaining bits (bits N−1 to 1) may be mapped to individual cells 125 in the row 124.

TABLE I

AN EXEMPLARY INDICIA MAP

| BITN | BITN-1 | BITN-2 | ... | BIT2 | BIT1 |
|------|--------|--------|-----|------|------|
| ROW  | COLN-1 | COLN-2 | ... | COL2 | COL1 |

Figure 4B:
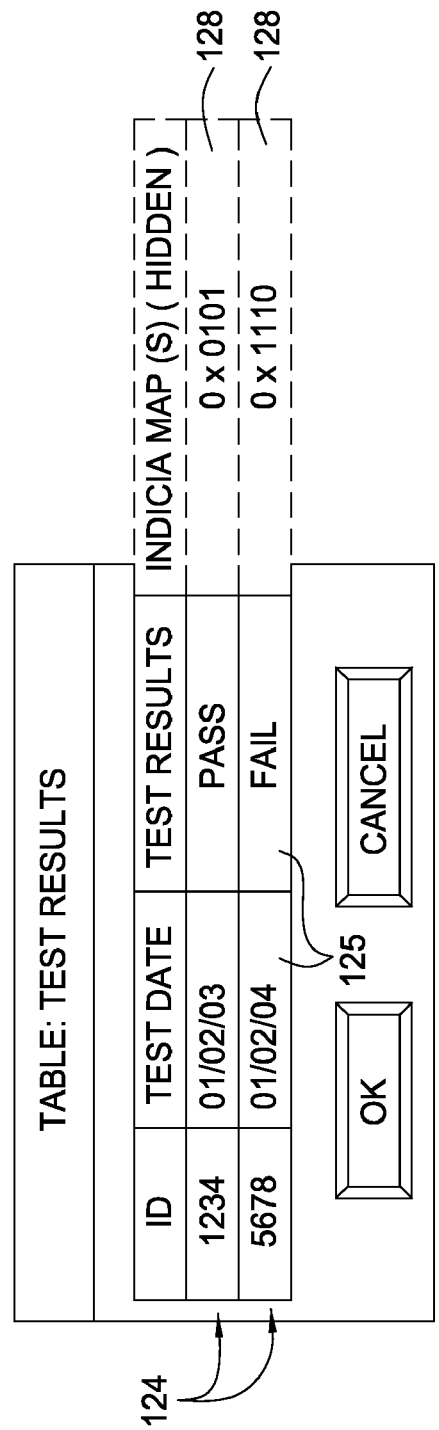

Using this technique, indicia maps having N-bits may be used to indicate the existence of annotations for rows having N−1 columns. Thus, the type of data structure used for an indicia map may depend on the number of columns in a view (e.g., a single 8-bit byte for up to 7 columns, a 32-bit integer for up to 31 columns, etc.). Of course, different type data structures may also be combined in any appropriate manner to accommodate views with a greater number of columns (e.g., two integers may be combined to indicate annotations for up to 63 columns). In any case, as illustrated in FIG. 4B, indicia maps may be considered as being an additional "hidden" field that indicates the existence of annotations for object in the view 122.

For some embodiments, groups of data objects, such as groups of cells (within the same row or multiple rows) may also have corresponding annotations. As such, other types of indicia maps (e.g., utilizing other types of data objects than the bit map shown in TABLE I) capable of indicating the existence of annotations for such groups of objects may be utilized. For example, an indicia map may dedicate multiple bits (e.g., a byte) for specifying group boundaries, such as a start and end column, or a start column and a length. Accordingly, it should be appreciated that the indicia map shown TABLE I is merely a simplified example of a technique for indicating annotated objects with an indicia map.

FIG. 3B is a flow diagram of exemplary operations 320 that may be performed, for example, as part of a subroutine that returns an indicia map for each row in a view of data. The operations 320 begin, at step 321, and at step 322, a loop of operations (324-336) is entered, to be performed for each row. In other words, each time through the loop, an indicia map (indicating which data objects are annotated) for a different row is generated.

At step 324, the primary key for the row is retrieved. For example, the subroutine may be passed a parameter indicating the data source of the results in the view, and a set of primary keys identifying the rows. In case the primary keys were not part of the results set specified for the original query, the query may be modified to add primary keys to the result set.

Regardless, at step 326, annotation information is retrieved, based on the primary key and the data source. For example, the annotation store may be queried, to determine if entries exist in the index table for the row and/or for individual cells of the row. If an annotation exists for the row, as determined at step 328, the row bit (e.g., the most significant bit, as shown in TABLE I) is set. At step 336, bits in the bit bask are set for each annotated cell in the row, as determined at step 334. After these operations are repeated for each row, the indicia maps are returned, at step 338.

In some cases, the annotation store may be searched for annotations pertaining to the specified data source. In such cases, a temporary table may be constructed in memory, by constructing a query based on a primary key and a data source, for example, with a user defined function (UDF) designed to return values for use in generating the indicia map. TABLE II illustrates, in SQL pseudocode, an exemplary user defined function to generate entries for a temporary table (T6) shown in TABLE III.

TABLE II

PSEUDOCODE FOR IDENTIFYING ANNOTATIONS

```
WITH T6 AS
SELECT DISTINCT
   T5.COL1,
   CASE
      WHEN a cell, identified by T5.COL1 and COL1, has annotation
   THEN b'0001'
      WHEN a cell, identified by T5.COL1 and COL2, has annotation
   THEN b'0010'
      WHEN a cell, identified by T5.COL1 and COL3, has annotation
   THEN b'0010'
      WHEN a row in T5, identified by T5.COL1, has annotation
      THEN b'1000'
      ELSE 0
END AS METACOL
      FROM TABLE T5
```

This simplified example assumes table T5 (corresponding to the displayed view) has three columns, allowing an indicia map with 4 bits to indicate annotations for the row and columns. The example further assumes that the first column (COL1) contains a primary key value.

As shown below, in TABLE III, the resultant table T6 may have entries corresponding to each annotated data object. While not shown, rows with no

TABLE III

TEMPORARY TABLE INDICATING ANNOTATIONS

| Primary Key (Row Number) | MetaCol |
|--------------------------|---------|
| 1 | 0001 |
| 1 | 0100 |
| 2 | 1000 |
| 2 | 0100 |
| 2 | 0010 | annotations would have NULL (e.g., b'0000') entries. The entries for each row may be combined to generate the final indicia map, and joined with the results table T5 (as shown in FIG. 4B), for example, using the following exemplary code listed in TABLE IV:

TABLE IV

PSEUDOCODE FOR GENERATING INDICIA MAP

```
SELECT T5.*, SUM(T6.METACOL) AS METACOL
FROM
   TABLE5 T5
      INNER JOIN
   TABLE6 T6
ON T5.COL1 = T6.COL1
   GROUP BY T6.COL1
```

This select statement joins the temporary table with the table corresponding to the displayed view (T5). The result of the SUM statement will be the summing of the individual (MetaCol) values shown in TABLE III. As illustrated in FIG. 4B, summing the two entries for ROW 1 (b'0001' and b'0100') yields 0x0101, indicating annotations for the first and third column cells, while summing the three entries for ROW 2 (b'1000', b'0100', and b'0010') yields 0x1110, indicating annotations for the row, as well as second and third column cells.

FIG. 3C is a flow diagram of exemplary operations 340 that may be performed to provide an indication of annotations, based on the indicia maps generated for each row. The operations 340 begin, at step 341, and at step 342, a loop of operations (344-352) is entered, to be performed for each row. Each time through the loop, annotation icons are displayed based on the indicia map for a different row.

At step 344, the most significant bit (or other bit corresponding to the row) is examined and, if set, an annotation icon for the row is displayed, at step 346. At steps 348-352, the remaining bits corresponding to the individual cells are examined (350), and annotation icons for individual cells are displayed accordingly, at step 352.

Figure 4C:
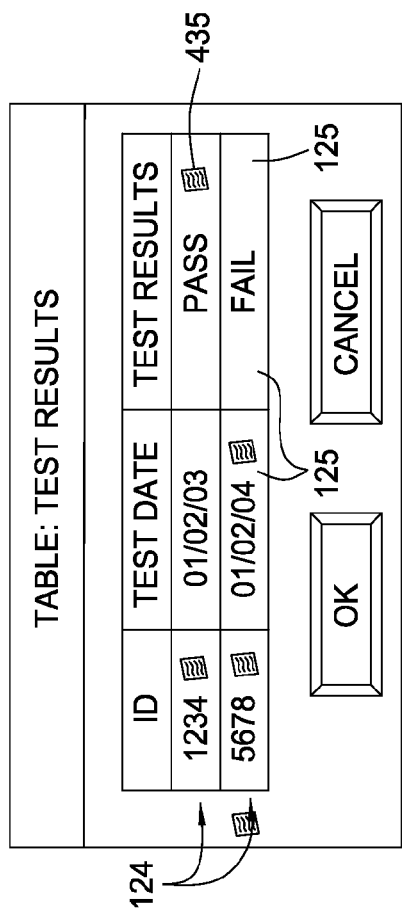

As illustrated in FIG. 4C, annotation icons 435 may be displayed proximate annotated data objects. For some embodiments, if multiple annotations exist for a single object, a single icon indicating multiple annotations (e.g., having a different color than other icons indicating a single annotation) or multiple annotation icons may be displayed. In response to a user selecting the annotation icon 435 (e.g., via a mouse click), the corresponding annotation may be displayed, for example, in the GUI screen 420 shown in FIG. 4D.

Figure 4E:
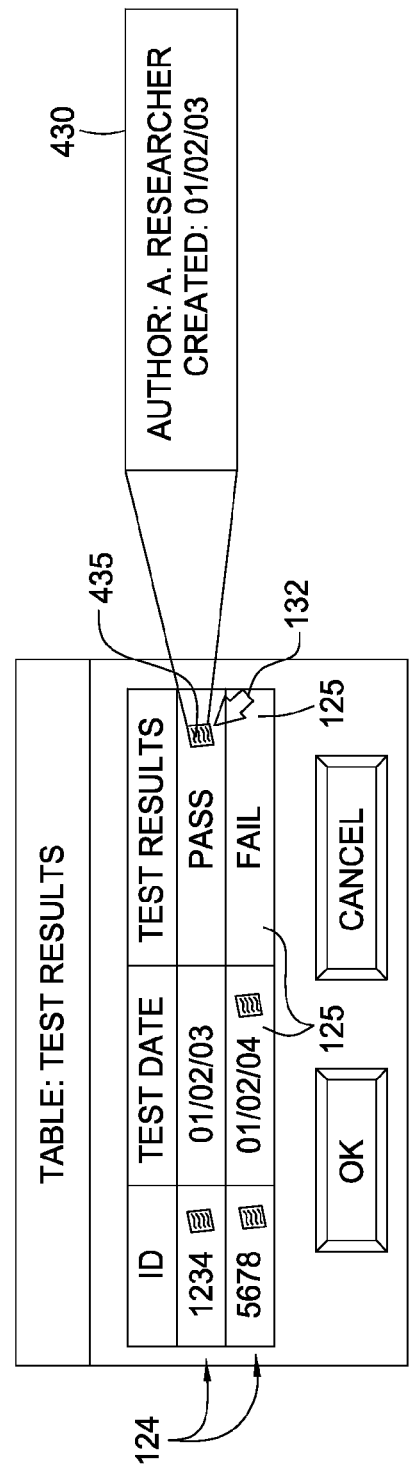

For some embodiments, as illustrated in FIG. 4E, a user may be able to view a limited amount of information regarding an annotation (e.g., author and creation date) as "fly-over" text 430, for example, by placing a mouse cursor 432 over the corresponding annotation icon. This limited amount of information may be retrieved, for example, when annotation information is retrieved (e.g., at step 326 of FIG. 3B) as part of the operations performed to identify the existence of annotations for data objects in a view. Initially retrieving only this limited amount of information may be desirable for performance reasons, as the entire annotation may include a substantial amount of data. From this initial retrieval, a global unique identifier (GUID) identifying the corresponding annotation may be retained, which may facilitate retrieving the entire annotation when requested by a user for display.

Conclusion

While there are typically no explicit relational links between an annotation store and a data source containing the annotated data, embodiments of the present invention provide systems and methods for identifying and indicating annotations for displayed data. For some embodiments, by querying an annotation store to identify annotations corresponding to a displayed view of data, one or more indicia maps indicating which data objects are annotated may be generated. Using these indicia maps, an indication of the annotated data objects may be provided, for example, as annotation icons displayed proximate the annotated data objects.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing a program for indicating objects in a view of data that have annotations which, when executed by a processor, performs operations comprising:
   querying an annotation store to identify annotations corresponding to objects in the view;
   generating one or more indicia maps indicating objects in the view having the identified corresponding annotations, wherein each indicia map includes a plurality of bits and wherein each bit is set to indicate an existence of an annotation for a corresponding one of the objects in the view of data; and
   providing an indication of those objects in the view having the identified corresponding annotations, based on the one or more indicia maps.

2. The non-transitory computer-readable medium of claim 1, wherein querying the annotation store comprises querying a data source separate from a data source containing the corresponding objects in the view.

3. The non-transitory computer-readable medium of claim 2, wherein the view of data comprises a portion of a text document.

4. The non-transitory computer-readable medium of claim 2, wherein:
   the view of data comprises a relational view of data having rows of individual cells; and
   each indicia map comprises a single bit corresponding to a row and one or more bits corresponding to individual cells in the row.

5. The non-transitory computer-readable medium of claim 4, wherein querying the annotation store to identify annotations corresponding to objects in the view comprises generating and executing a query specifying a data source and one or more primary keys identifying rows in the view.

6. A system for indicating objects in a view of data having corresponding annotations, comprising:
   a processor;
   a memory;
   an annotation database for storing annotation records containing annotations; and
   an executable component stored in the memory, which, when executed on the processor is configured to query the annotation database to identify annotations corresponding to objects in the view, generate one or more indicia maps indicating objects in the view having corresponding annotations wherein each indicia map includes a plurality of bits and wherein each bit is set to indicate an existence of an annotation for a corresponding one of the objects in the view of data, and provide an indication of those objects in the view having the identified corresponding annotations, based on the one or more indicia maps.

7. The system of claim 6, wherein:
   the view of data comprises a relational view of data having rows of individual cells; and
   each indicia map comprises a single bit corresponding to a row and one or more bits corresponding to individual cells in the row.

8. The system of claim 7, wherein the executable component is configured to query the annotation database to identify annotations corresponding to objects in the view by generating and executing a query specifying a data source and one or more primary keys identifying objects in the view.

9. The system of claim 8, wherein the executable component is further configured to obtain the one or more primary keys by modifying a query designed to generate the view of data.

* * * * *